(12) United States Patent
Kaneko et al.

(10) Patent No.: US 12,276,510 B2
(45) Date of Patent: Apr. 15, 2025

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yusuke Kaneko, Toyota (JP); Junya Masui, Nagoya (JP); Yui Nakamura, Nagoya (JP); Ai Fujimura, Nisshin (JP); Keisuke Tsujimoto, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 18/368,076

(22) Filed: Sep. 14, 2023

(65) Prior Publication Data
US 2023/0417562 A1   Dec. 28, 2023

Related U.S. Application Data

(63) Continuation of application No. 16/532,582, filed on Aug. 6, 2019, now Pat. No. 11,796,329.

(30) Foreign Application Priority Data

Aug. 8, 2018   (JP) ................. 2018-149257

(51) Int. Cl.
*G01C 21/34*   (2006.01)
*G01C 21/36*   (2006.01)
*G05D 1/00*   (2006.01)

(52) U.S. Cl.
CPC ..... *G01C 21/3438* (2013.01); *G01C 21/3476* (2013.01); *G01C 21/3626* (2013.01); *G05D 1/0212* (2013.01); *G05D 1/0287* (2013.01)

(58) Field of Classification Search
CPC ............ G01C 21/3438; G01C 21/3453; G01C 21/3626; G08G 1/096811; G08G 1/096844; G08G 1/205
See application file for complete search history.

(56) References Cited

U.S. PATENT DOCUMENTS

| | | |
|---|---|---|
| 2017/0098184 A1 | 4/2017 | Marco et al. |
| 2017/0351990 A1 | 12/2017 | Hecht et al. |

(Continued)

FOREIGN PATENT DOCUMENTS

| | | |
|---|---|---|
| JP | 2004-227262 A | 8/2004 |
| JP | 2014-191725 A | 10/2014 |

OTHER PUBLICATIONS

Jun. 8, 2021 U.S. Office Action issued U.S. Appl. No. 16/532,582.
(Continued)

*Primary Examiner* — Anshul Sood
(74) *Attorney, Agent, or Firm* — Oliff PLC

(57) ABSTRACT

An information processing apparatus comprising a controller comprising at least one processor configured to perform: acquiring a request that a first vehicle join up with a different vehicle; determining on the basis of a piece of route information indicating a travel route for the first vehicle and current locations of a plurality of vehicles different from the first vehicle, a joining cost related to joining up with the first vehicle for each of the plurality of vehicles; determining a second vehicle that is to join up with the first vehicle and a joining point such that the joining cost satisfies a prescribed condition.

3 Claims, 13 Drawing Sheets

(56) References Cited

U.S. PATENT DOCUMENTS

| | | |
|---|---|---|
| 2018/0149484 A1 | 5/2018 | Baer |
| 2018/0275648 A1 | 9/2018 | Ramalingam |
| 2019/0325389 A1 | 10/2019 | Dearing |
| 2020/0012971 A1 | 1/2020 | Chouinard et al. |

OTHER PUBLICATIONS

Jan. 24, 2022 Office Action Issued in U.S. Appl. No. 16/532,582.
Oct. 5, 2022 Office Action issued in U.S. Appl. No. 16/532,582.
Feb. 13, 2023 Office Action Issued in U.S. Appl. No. 16/532,582.
Jul. 8, 2021 U.S. Office Action issued U.S. Appl. No. 16/532,582.
Jun. 14, 2023 Notice of Allowance issued in U.S. Appl. No. 16/532,582.

| PIECE OF ROUTE INFORMATION ||
|---|---|
| ROUTE LOCATION ID | LOCATION |
| 0 | (0,5) |
| 1 | (1,5) |
| 2 | (1,4) |
| 3 | (1,3) |
| 4 | (1,2) |
| 5 | (2,2) |
| 6 | (3,2) |
| 7 | (4,2) |
| 8 | (5,2) |
| 9 | (6,2) |
| 10 | (6,1) |
| 11 | (6,0) |

Fig. 3B

| PIECE OF CURRENT PLACE INFORMATION |||
|---|---|---|
| VEHICLE | VEHICLE ID | LOCATION |
| A | 1 | (1,3) |
| B | 2 | (3,4) |
| C | 3 | (4,3) |
| D | 4 | (5,4) |

Fig. 3C

| PIECE OF SECOND ROUTE INFORMATION |||| 
|---|---|---|---|
| ROUTE LOCATION ID | LOCATION | ROUTE LOCATION ID | LOCATION |
| 0 | (0,5) | 10 | (4,2) |
| 1 | (1,5) | 11 | (5,2) |
| 2 | (1,4) | 12 | (6,2) |
| 3 | (1,3) | 13 | (4,1) |
| 4 | (2,3) | 14 | (5,1) |
| 5 | (3,3) | 15 | (6,1) |
| 6 | (4,3) | 16 | (4,0) |
| 7 | (1,2) | 17 | (5,0) |
| 8 | (2,2) | 18 | (6,0) |
| 9 | (3,2) | | |

Fig. 6B

| PIECE OF SECOND ROUTE INFORMATION | | | | | | | | |
|---|---|---|---|---|---|---|---|---|
| ROUTE INFORMATION 1 | | ROUTE INFORMATION 2 | | ... | ROUTE INFORMATION 23 | | ROUTE INFORMATION 24 | |
| ROUTE LOCATION ID | ROUTE LOCATION | ROUTE LOCATION ID | ROUTE LOCATION | | ROUTE LOCATION ID | ROUTE LOCATION | ROUTE LOCATION ID | ROUTE LOCATION |
| 0 | (0,5) | 0 | (0,5) | | 0 | (0,5) | 0 | (0,5) |
| 1 | (1,5) | 1 | (1,5) | | 1 | (1,5) | 1 | (1,5) |
| 2 | (1,4) | 2 | (1,4) | | 2 | (1,4) | 2 | (1,4) |
| 3 | (1,3) | 3 | (1,3) | | 3 | (1,3) | 3 | (1,3) |
| 4 | (1,2) | 4 | (2,3) | | 4 | (2,3) | 4 | (2,3) |
| 5 | (2,2) | 5 | (2,2) | | 5 | (3,3) | 5 | (3,3) |
| 6 | (3,2) | 6 | (3,2) | | 6 | (4,3) | 6 | (4,3) |
| 7 | (4,2) | 7 | (4,2) | | 7 | (4,2) | 7 | (4,2) |
| 8 | (5,2) | 8 | (5,2) | | 8 | (4,1) | 8 | (4,1) |
| 9 | (6,2) | 9 | (6,2) | | 9 | (5,1) | 9 | (4,0) |
| 10 | (6,1) | 10 | (6,1) | | 10 | (5,0) | 10 | (5,0) |
| 11 | (6,0) | 11 | (6,0) | | 11 | (6,0) | 11 | (6,0) |

Fig. 7

| PIECE OF LOCATION CANDIDATE INFORMATION | | | | | |
|---|---|---|---|---|---|
| VEHICLE | VEHICLE ID | LOCATION | VEHICLE | VEHICLE ID | LOCATION |
| A | 1 | (1,3) | D | 9 | (6,4) |
| B | 2 | (3,5) | D | 10 | (6,3) |
| C | 3 | (5,4) | D | 11 | (7,3) |
| C | 4 | (6,4) | D | 12 | (8,3) |
| C | 5 | (7,4) | D | 13 | (8,2) |
| C | 6 | (8,4) | D | 14 | (8,1) |
| C | 7 | (9,4) | D | 15 | (9,1) |
| D | 8 | (6,5) | | | |

Fig. 8B

INFORMATION PROCESSING APPARATUS, INFORMATION PROCESSING METHOD, AND NON-TRANSITORY STORAGE MEDIUM

CROSS-REFERENCE TO THE RELATED APPLICATION

This application is a continuation of U.S. application Ser. No. 16/532,532 filed Aug. 6, 2019, which is based on and claims priority under 35 U.S.C. 119 from Japanese Patent Application. No. 2018-149257, filed on Aug. 8, 2018, which is hereby incorporated by reference herein in its entirety.

BACKGROUND

Technical Field

The present disclosure relates to an information processing apparatus, an information processing method, and a non-transitory storage medium for determining a transfer destination in ride sharing.

Description of the Art

A conventional method (form of transportation) called ride sharing meaning that a plurality of people with different goals ride in the same automobile is available to improve automobile transport efficiency. The ride sharing allows the people to travel more inexpensively than when the people travel in separate automobiles.

Additionally, use of ride sharing often saves a utilizer from having to drive an automobile by itself. Ride sharing is expected as new means of traveling for users which do not own automobiles.

One of such ride-sharing techniques is a technique described Japanese Patent Laid-Open No. 2004-227262. Japanese Patent Laid-Open No. 2004-227262 discloses a ride-sharing pickup car technique for accepting pickup locations and dropoff locations from a plurality of utilizers and determining a more efficient travel route in accordance with the order of acceptance, the pickup locations, and the dropoff locations. Japanese Patent Laid-Open No. 2004-227262 does not disclose transfer of a utilizer.

SUMMARY

Under the circumstances, it is an object of the present disclosure to provide an information processing apparatus capable of determining a vehicle, to which a utilizers is to transfer, in a form of transportation in which a plurality of utilizers ride in the same vehicle and travel.

A first aspect of the present disclosure may be an information processing apparatus comprising a controller comprising at least one processor configured to perform: acquiring a request that a first vehicle up with a different vehicle; determining, on the basis of a piece of route information indicating a travel route for the first vehicle and current locations of a plurality of vehicles different from the first vehicle, a joining cost related to joining up with the first vehicle for each of the plurality of vehicles; determining a second vehicle that is to join up with the first vehicle and a joining point such that the joining cost satisfies a prescribed condition; and transmitting a piece of information on the joining point to the second vehicle.

A second aspect of the present disclosure may be an information processing method comprising: a step of acquiring a request that a first vehicle join up with a different vehicle; a step of determining, on the basis of a piece of route information indicating a travel route for the first vehicle and current locations of a plurality of vehicles different from the first vehicle, a joining cost related to joining up with the first vehicle for each of the plurality of vehicles; a step of determining a second vehicle that is to join up with the first vehicle and a joining point such that the joining cost satisfies a prescribed condition; and a step of transmitting a piece of information on the joining point to the second vehicle.

A third aspect of the present disclosure may be a non-transitory storage medium having recorded thereon a program for causing a computer to execute: a step of acquiring a request that a first vehicle join up with a different vehicle; a step of determining, on the basis of a piece of route information indicating a travel route for the first vehicle and current locations of a plurality of vehicles different from the first vehicle, a joining cost relate to joining up with the first vehicle for each of the plurality of vehicles; a step of determining a second vehicle that is to join up with the first vehicle and a joining point such that the joining cost satisfies a prescribed condition; and a step of transmitting a piece of information on the joining point to the second vehicle.

According to the present disclosure, it is possible to determine a vehicle, to which a utilizer is to transfer, in a form of transportation in which a plurality of utilizers ride in the same vehicle and travel.

BRIEF DESCRIPTION OF THE DRAWINGS

FIGS. 3A to 3C are charts for explaining a piece of route information and a piece of current place information according to the first embodiment;

FIGS. 6A and 6B are charts for explaining a piece of second route information according to a first modification;

FIG. 7 is a chart for explaining a different piece of second route information according to the first modification; and FIGS. 8A and 8B, are charts for explaining a piece of location candidate information according to a second modification.

DESCRIPTION OF THE EMBODIMENTS

Figure 1:
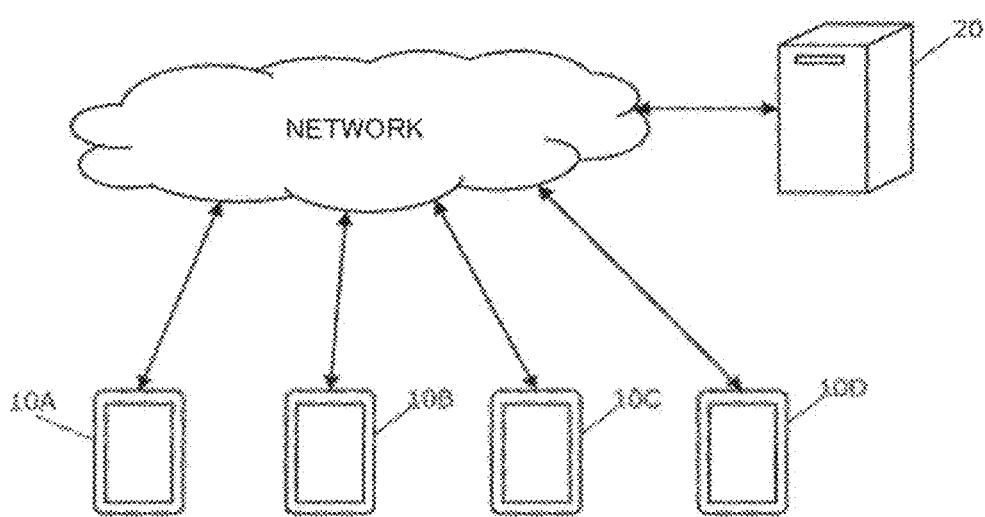
FIG. 1 is a configuration diagram of an information processing system according to a first embodiment.

In the information processing apparatus according to the first aspect of the present disclosure, the piece of route information may be a piece of information on a travel route, along which a vehicle is currently traveling, and may include, for example, a plurality of points, through which the vehicle is to travel (pass). The travel route of the piece route information may be a travel route between a determined start location and a determined end location, a travel route for one day, a travel route at a time within a prescribed time period after a current time, or a travel route within a prescribed range, such as a given district. The plurality of vehicles may be vehicles which are candidates to loin up with the first vehicle and may be any vehicles as long as the vehicles can travel to the joining point. That is, the plurality of vehicles may be traveling or utilizers may be in the plurality of vehicles. The joining cost is an indicator of difficulty in joining. A lower value may indicate easier joining while a higher value may indicate more difficult joining. The prescribed condition may be a condition that the joining cost has a smallest value a condition that the joining cost be smaller than a predetermined value, as long as the condition: ensures easy joining. This configuration makes it possible to determine a vehicle which can join up easily and a point which facilitates the joining as a vehicle which is to join up the second vehicle) and the joining point even if the first vehicle and the different vehicle are traveling.

Methods for determining the second vehicle may include a method that determines a candidate point for joining for each of the plurality of vehicles and then determines the second vehicle on the basis of a joining cost for the candidate point for each of the plurality of vehicles. The method for determining the second vehicle may also include a method that determines a vehicle which can join up easily for each of candidate points for joining and then determines the second vehicle on the basis of a joining cost from the vehicle that can join up easily to each of the candidate points for joining.

The prescribed condition may be a condition that the joining cost has a smallest value. The piece of route information may include a piece of information on a predetermined travel route from a vehicle current location to a place of arrival. The place of arrival here may refer to a point, at (to) which a vehicle intends to arrive (travel) after the present. This configuration makes it possible to determine the joining point and the second vehicle on the basis of a route, along which a vehicle intends to travel from the vehicle current location. That is, it is possible to reduce a burden of travel on a utilizer in the first vehicle by taking into consideration an intended travel route for the first vehicle.

The controller may change a piece of route information for the first vehicle such that the piece of route information includes a piece of information on a plurality of travel routes from the current location of the first vehicle to the place of arrival via different way points and such that a difference between a travel cost for each of the plurality of travel routes and a travel cost for the predetermined travel route is not more than prescribed threshold.

The way point here may refer to a point, through which a vehicle needs to pass and may be, for example, a pickup and dropoff point for a utilizer in the vehicle, a point of delivery of a package, or the like. The travel cost is an indicator of difficulty in travel. A smaller travel cost may indicate easier travel while a larger travel cost may indicate more difficult travel. The travel cost may be, for example, a travel distance, a travel time period, a fuel cost for travel, or the like. This configuration makes it possible to determine the joining point and the second vehicle on the basis of a plurality of routes, along which a vehicle can travel from the vehicle current location in the present and the future. That is, since the range of choice for the joining point increases, a joining point which allows the second vehicle to join up more easily can be determined. The prescribed threshold may refer to a travel cost which is an excess over a smallest travel cost from the current location to the place of arrival and can be tolerated by the first vehicle. For example, the prescribed threshold may be increased with increase in a value of the smallest travel cost.

The controller may determine a point, the joining cost related to joining for the point having a lowest value, as the joining point among prescribed points included in the piece of route information for the first vehicle. The prescribed points may be each a point that included in a travel route from after the current location of the first vehicle to the place of arrival.

The above-described configuration allows determination of the joining point from the travel route for the first vehicle. Thus, the first vehicle can join up without changing a way point, through which the first vehicle needs to go, the place of arrival, and the like, and the burden of travel on a utilizer in the first vehicle can be reduced.

The prescribed points may be each a point, a travel cost from the current location of the first vehicle to the point boing larger than a travel cost from a current location of the second vehicle to the point. This configuration makes it possible to prevent the first vehicle from arriving at the joining point earlier than the second vehicle to join up. Thus, for example, if a utilizer makes transfer from the first vehicle to the second vehicle, the utilizer can make transfer without waiting at the joining point. This improves convenience.

The joining cost may be a travel cost from the current location of each of the plurality of vehicles to the prescribed point. This configuration allows determination of the second vehicle that can travel easily from the current location to the travel route for the first vehicle and the joining point that facilitates the travel. That is, a travel time period and a travel distance for the second vehicle from a current point in tame to a joining point in time can be lessened. It is thus possible to reduce, for example, a burden on a utilizer in the second vehicle.

The joining cost may be a travel cost from the current location of each of the plurality of vehicles to a prescribed goal via the prescribed point. The prescribed goal here may refer to a goal designated by the first vehicle, and may be a goal for a utilizer in the first vehicle or a delivery destination of an article or the like. This configuration allows determination of the second vehicle that can travel easily from the current location to the prescribed goal and the joining point that facilitates the travel. This allows determination of the second vehicle that can travel to the prescribed goal at a low travel cost and the joining point that facilitates the travel. That is, the travel time period and the travel distance far the second vehicle from the current point in time to a point in time of arrival at the prescribed goal can be lessened.

The controller may acquire a piece of intended route information that is a piece of information on points on an intended travel route from the current location for each of the plurality of vehicles, and the joining cost may be a travel cost from the point on the intended travel route to the prescribed point for each of the plurality of vehicles. The piece of intended route information here may be a part of the niece of route information and may refer to a piece of information on a travel route, along which a vehicle intends to travel in the present and the future and which includes the current location. This configuration allows determination of the second vehicle that can travel easily from the intended travel route to the travel route for the first vehicle and the joining point that facilitates the travel. That is, a travel time period and a travel distance for the second vehicle from a given point in time on the intended route to the joining point in time can be lessened. Thus, the second vehicle can join up from an original travel route at a small travel cost.

The joining cost may be a larger one of a travel time period from the current location of the first vehicle to a prescribed goal via the prescribed point and a shortest travel time period among respective travel time periods from the current locations of the plurality of vehicles to the prescribed goal via the prescribed point. This configuration allows determination of the second vehicle, a sum of a time period from when the second vehicle is at the current location to when the second vehicle joins up on the travel route for the first vehicle and a time period from the joining to arrival at the prescribed goal being small, and the joining point that involves the smallest sum. That is, for example, a travel time period in a case where a user in the first vehicle travels from a current location to the prescribed goal by making transfer to the second vehicle can be lessened.

The information processing apparatus further may include a storage configured to store a plurality of pieces of route information, and the controller may determine, as the plurality of vehicles, vehicles corresponding to pieces of route information including the prescribed goal among the plurality of pieces of route information. This configuration allows determination of a vehicle which travels to (goes through) the prescribed goal as a candidate for the second vehicle. Thus, the second vehicle need not significantly change a route due to the joining. Additionally, since vehicles as objects of joining cost calculation can be reduced in advance, the amount of calculation of the information processing apparatus can be cut.

The prescribed goal may be a goal for a utilizer in the first vehicle. The travel cost may be a travel distance or a travel time period. That is, the travel cost indicates difficulty in travel while the joining cost is evaluated in difficulty in joining on the basis of the travel cost.

The controller may transmit, to the second vehicle, a piece of information on a predetermined travel route from the joining point to the place of arrival for the first vehicle, in addition to a piece of information on the joining point. This configuration allows the second vehicle to travel along a travel route, along which the first vehicle intends to travel. Thus, for example, if the first vehicle needs to run on a different travel route in spite of the first vehicle being a vehicle, such as a route bus, a route for which is unchangeable, the second vehicle can take over the role of the first vehicle. That is, it is possible to curb influence of joining on a utilizer in the first vehicle.

First Embodiment

An information processing apparatus according to a first embodiment of the present disclosure determines a vehicle, which one vehicle (automobile) is to make transfer to (join up with), from a piece of information on a travel route (a piece of route information) for the vehicle which is determined in advance and current locations of a plurality of other vehicles. With this configuration, it is possible to easily determine a vehicle, which a utilizer is to transfer to, while curbing decline in the convenience for the utilizer.

[Configuration of Information Processing System]

An outline of an information processing system according to the present embodiment will be described first with reference to FIG. 1 that is a configuration diagram of the information processing system. The information processing system includes a terminal 10 which is installed a vehicle and a management server 20. Note that, in the present embodiment, the terminal 10 installed in a vehicle A is referred to as a terminal 10A, the terminal 10 installed in a vehicle B is referred to as a terminal 10B, and that the name applies to terminal 10C and 10D. Note that the terminals 10A to 10D have respective same configurations. Each of the terminals 10A to 10D and the management server 20 can communicate via a networ.

The terminal 10 is an information terminal which is installed in a vehicle. The terminal 10 can acquire a current location of the vehicle and transmits a piece of information on the location to the management server 20 together with a transfer instruction (request) accepted from a utilizer or the like. The terminal 10 also receives a transfer destination vehicle and a transfer location (joining point) from the management server 20. Note that the terminal 10 is not limited to an information terminal installed in a vehicle and may be an information terminal possessed by a driver or an information terminal possessed by a utilizer (ride partner). The terminal 10 may be any apparatus, such as a PC, a smartphone, or a tablet, as long as the apparatus can acquire the current location of the vehicle.

The management server 20 is an Information processing apparatus which manages a piece of information on a vehicle with the terminal 10. The management server 20 stores a piece of information on a travel route (a piece of route information) for a vehicle, in which the terminal 10 is installed. Upon receipt of a transfer instruction from the terminal 10, the management server 20 determines a transfer destination vehicle and a transfer location from current locations of and pieces of route information for vehicles and transmits the determined pieces of information to the terminal 10 in a transfer source vehicle and the terminal 10 in the transfer destination vehicle. Note that the management server 22 may be any information processing apparatus, such as a smartphone or a tablet, as long as the information processing apparatus can perform information processing and that, for example, one terminal 10 may double as the management server 20. A travel route in a piece of route information may be a travel route between a determined start location and a determined end location (piece of arrival), a travel route for one day, a travel route at a time within a prescribed time period after a current time, or a travel route within a prescribed range, such as a given district.

[Concerning Configuration of Terminal]

Figure 2A:
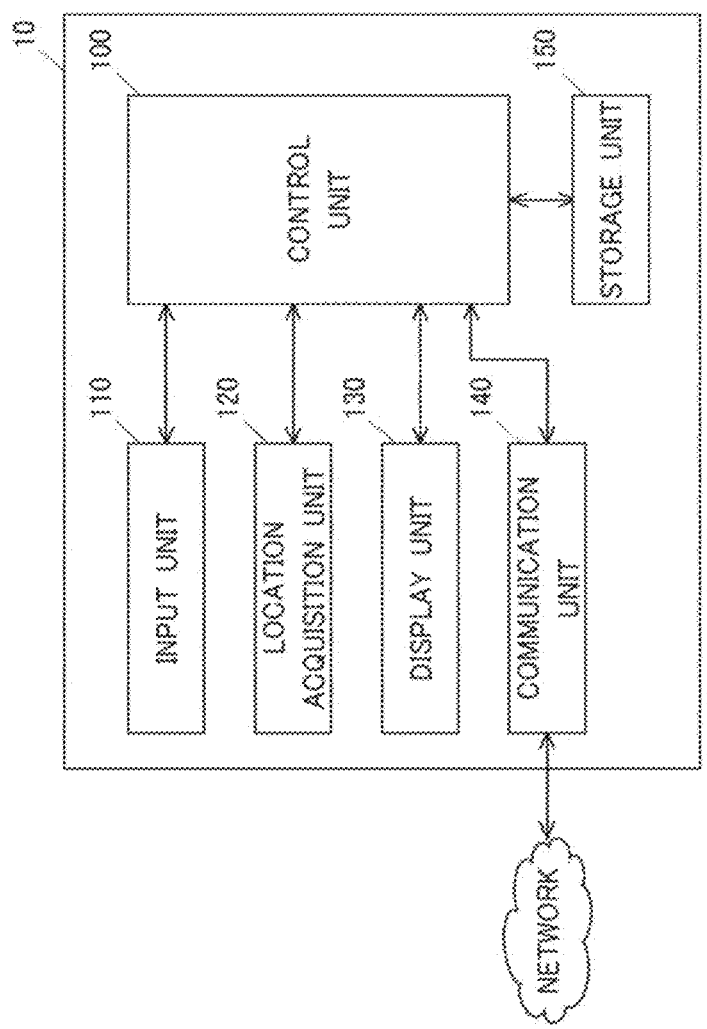
FIGS. 2A and 2B are configuration diagrams of a terminal and management server according to the first embodiment.

A configuration of the terminal 10 will be described below with reference to a configuration diagram illustrated in FIG. 2A. The terminal 10 includes a control unit 100, an input unit 110, a location acquisition unit 120, a display unit 130, and a communication unit 140. Note that functional units possessed oy the terminal 10A will hereinafter be referred to as XXXA. For example, an input unit possessed by the terminal 10A is referred to as an input unit 110A, and a display unit possessed by the terminal 10A is referred to as a display unit 130. The same applies to functional units possessed by the terminals 10B to 10D.

The control unit 100 is a CPU (Central Processing Unit) that Controls the functional units of the terminal 10 in accordance with a program stored in a storage unit 150.

The input unit 110 accepts an operation (an instruction or a request) from a user, such as a driver or a utilizer. Although the input unit 110 accepts an operation which desires transfer in the present embodiment, the input unit 110 may be capable of accepting, for example, an operation for checking a travel route for a vehicle or an operation for checking an intended arrival time.

The location acquisition unit 120 acquires a current location of the terminal 10 as a current location of a vehicle. More specifically, for example, the location acquisition unit 120 acquires a current latitude and longitude of the terminal 10 via a GPS (Global Positioning System) possessed by itself. Note that the location acquisition unit 120 need not always acquire a piece of location information via the GPS. For example, the location acquisition unit 120 may acquire a piece of location information from a piece of information on a radio link base station or a car navigation system installed in the car. If the location acquisition unit 120 includes an acceleration sensor, the location acquisition unit 120 may estimate a piece of location information in accordance with the sensor and acquire the piece of locations information.

The display unit 130 displays (gives notification of) a piece of transfer-related information, such as a transfer destination vehicle and a transfer location, to a user. Note that the display unit 130 can also provide a route navigation display in accordance with a piece of route information for the vehicle.

The communication unit 140 performs communication of a piece of location information for the vehicle, a piece of transfer-related information, and the like between the terminal 10 and the management server 20 via the external network. Note that although the terminal 10 and the network are assumed to communicate via a radio link in the present embodiment, communication may be performed via wired lines if the terminal 10 in a state capable of connecting with the network via the wired lines. Note that since the communication unit 140 is a functional unit possessed by the terminal 10 installed in the vehicle, the vehicle can also be said to be communicating with the management server 20.

The storage unit 150 stores a program for controlling the functional units and a piece of route information for the vehicle. Note that the storage unit 150 is composed of a plurality of storage members, such as ROM (Read-only Memory) storing a significant program for the system, RAM (Random Access Memory) for storage which allows fast access, and an HDD (Hard Disk Drive) storing large-volume data.

[Concerning Configuration of Management Server]

Figure 2B:
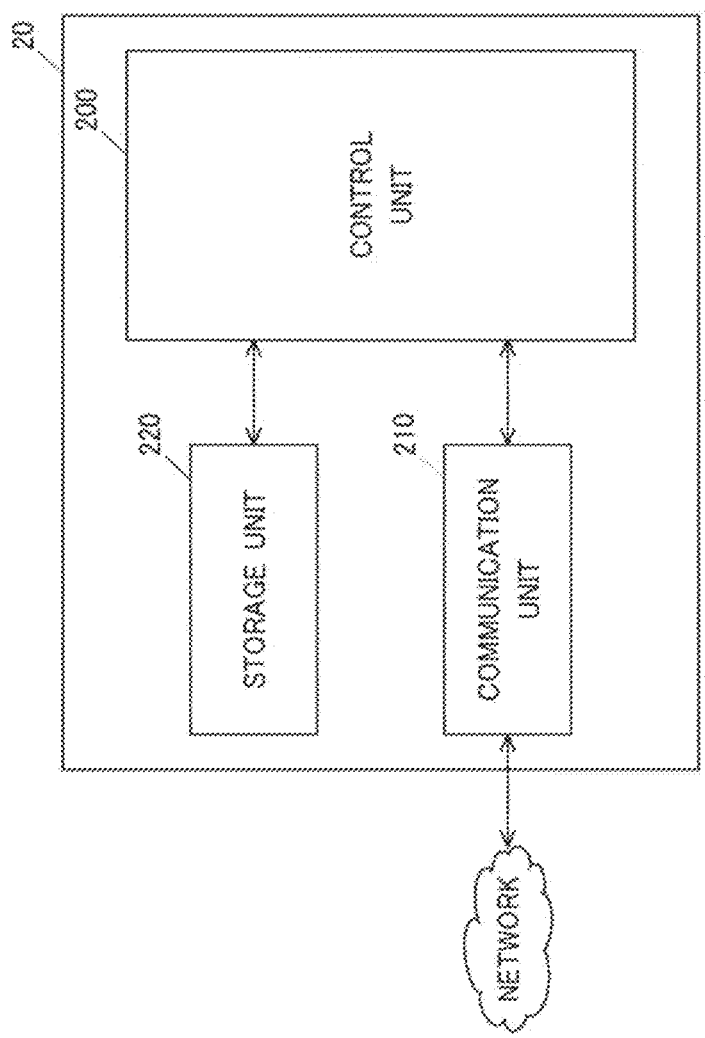

A configuration of the management server 20 will be described below with reference to a configuration diagram illustrated in FIG. 2B. The management server 20 includes a control unit 200, a communication unit 210, and a storage unit 220.

The control unit 200 is a CPU that controls the functional units in accordance with a program stored in the storage unit 220. The control unit 200 also determines a transfer destination vehicle and a transfer location from a piece of route information fox and a current location of a vehicle.

The communication unit 210 performs communication between the management server 20 and the terminal 10 that is related to a piece of location information of and transfer from a vehicle via the external network. Note that since the communication unit 210 is communicating with the terminal 10 installed in the vehicle, the communication unit 210 can also be said to be communicating with the vehicle.

The storage unit 220 stores a program for controlling the functional units and piece of route information for each vehicle. Note that the storage unit 220 is composed of a plurality of storage members, such as ROM Storing a significant program for the system, RAM for storage which allows fast access, and an HDD storing large-volume data, like the storage unit 150. Note that the storage unit 220 need not always store a piece of route information for a vehicle and that the control unit 200 may acquire a piece of vehicle information from the terminal 10 in each vehicle, as needed.

Note that, if one terminal 10 doubles as the management server 20, as described above, the functional units of the terminal 10 that have the same names as the functional units of the management server 20 may perform the above-described processing. That is, the control unit 100 may double as the control unit 200, the communication unit 140 may double as the communication unit 210, and the storage unit 150 may double as the storage unit 220.

[Concerning Piece of Route Information and Piece of Current Place Information]

Figure 3A:
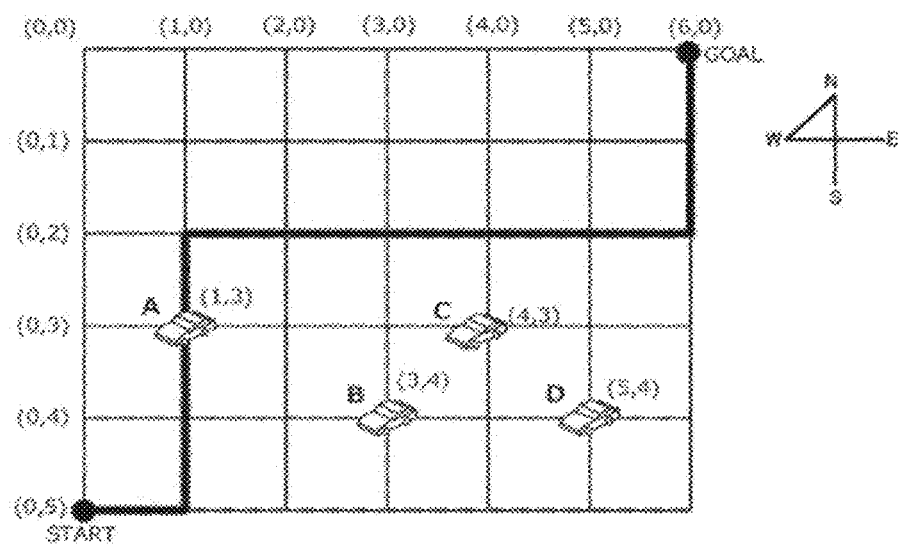

A Piece of route information and a piece of current place information used to determine a transfer destination vehicle and a transfer location (joining point) will be described FIG. 3A illustrates a rough map indicating a range within which the vehicles A to D can run, and each straight line represents a road on which a vehicle can run. A location in the range illustrated in FIG. 3A is expressed as (x,y), where x represents a location in an east-west direction while y represents a location in a south-north direction. More specifically, a location becomes closer to the east with increase a value of x and becomes closer to the south with increase in a value of y. In the present embodiment, roads are present within the range given $0 \leq x \leq 6$ and $0 \leq y \leq 5$. Note that although a location (x,y) will be described as a location of a vehicle for simplicity, a latitude and a longitude are actually used, and a location (a longitude, a latitude) is used as a location of a vehicle.

FIG. 3A illustrates that, at a current time t, the vehicle A is at a location (1,3), the vehicle B is at a location (3,4), the vehicle C is at a location (4,3), and the vehicle D is at a location (5,4) A bold line in FIG. 3A indicates a piece of route information for travel of the vehicle A and indicates that the vehicle A is currently running along a travel route such that the vehicle A starts traveling at a travel start location (0,5) and travels to a travel end location (6,0).

The piece of route information for the vehicle A that is converted into data (table form) and is stored in the storage unit 150A and the storage unit 220 is a piece of route information illustrated in FIG. 3B. In the present embodiment, a location, which vehicle A travels to, and a route location ID correspond to each other in the piece of route information, and a route location ID of 0 corresponds to a location at a travel start point in time (the travel start location) for the vehicle A. A larger route location ID indicates that a time when the vehicle A travels to (passes through) a location is later. Note that a location corresponding to a route location ID will hereinafter be referred to as a "route key location." For example, the piece of route information illustrated it FIG. 3B has 12 route key locations corresponding to route location IDs of 0 to 11. In the present embodiment, a storage unit 150A and the storage unit 220 store, of the travel route for the vehicle A, a location at an intersection of roads as a route key location. However, the storage unit 150A and the storage unit 220 may store not merely such a location but also a landmark location, which is present on the travel route for the vehicle A and allows easy transfer, as a route key location. That is, the storage unit 150A and the storage unit 220 may store a location suitable for transfer, such as a location, at which a car can stop for a prescribed time period or longer, or a location determined in advance as a stop. Alternatively, the storage unit 150A and the storage unit 220 may store, as route key locations, locations at prescribed intervals of the travel route for the vehicle A. That is, a route key location may be any location as as the location is a location (point) included in the travel route for the vehicle A. Note that since a piece of information on a location, which the vehicle A is to travel to after a current point in time, is used in the present embodiment, the piece of route information may be a piece of information on a predetermined travel route from a vehicle current location to the travel end location (a place of arrival). Note that the above-described travel end location may be where utilizer desires to go, or a last stop, a garage for the vehicle A, or the like.

Locations of the vehicles A to D at the time t which are converted into data as a piece of current place information are illustrated in FIG. 3C. The piece of current place information includes a piece of information on the vehicles, vehicle IDs corresponding to the vehicles, and current locations of the vehicles at the time t.

[Outline of Method for Determining Transfer Destination Vehicle and Transfer Location]

A transfer method in a case where a utilizer in the vehicle A corresponding to the piece of route information illustrated in FIG. 3B transfers from the vehicle A to a different vehicle at the time t will be described. In the present embodiment, a transfer method in a case where the vehicle A takes no routes other than one in the predetermined piece of route information in order to lessen a transfer burden on the utilizer in the vehicle A will be described.

Since the vehicle A travels along a route indicated by the bold line in FIG. 3A, the management server 20 chooses a vehicle which can travel (join up) most easily to (with) the route among the vehicles B to D. This aims at reducing a burden on drivers and utilizers in the vehicles B to D as much as possible. Note that the vehicles B to D desirably travel to a route, along which the vehicle A is to travel after the present, so as not to lower the travel efficiency of the vehicle A. Additionally, the present embodiment will describe the transfer method using a travel cost as an indicator of difficulty in travel (ease of travel). Note that a larger travel cost is assumed to indicate greater difficulty in travel. The travel cost is, for example, a travel time period or a travel distance. Note that, as a travel time period, an actual measurement value of a previous travel time period of each vehicle may be used, a value obtained by dividing a travel distance or a current average speed of each vehicle may be used, or a value obtained by correcting such a value in consideration of road traffic-jam information and weather information may be used. Alternatively, a vehicle running distance may be used or a linear distance may be used as a travel distance.

Assume that, as for travel between two locations in the example illustrated in FIG. 3A, a difference of 1 in the value of x in the location (x,y) corresponds to a travel cost of 1 and that a difference of 1 in the value of y corresponds to a travel cost of 1. For example, travel of the vehicle B at the location (3,4) to the location (1,3) needs an x-direction travel cost of 2 and a y-direction travel cost 1. A total travel cost is 3.

When the vehicle B at the location (3,4) travels to the travel route for the vehicle A, the vehicle B need to travel to a location (3,2) and involves a travel cost of 2. Additionally, when the vehicle at the location (4,3) travels to the travel route for the vehicle A, the vehicle C needs to travel to a location (4,2) and involves a travel cost of 1. When the vehicle D at the location (5,4) travels to the travel route for the vehicle A, the vehicle D needs to travel to a location (5,2) and involves a travel cost of 2. Since it can be judged from this that the vehicle C involves a lowest travel cost to travel to the travel route for the vehicle A, the management server 20 determines the vehicle C as a transfer destination vehicle for the utilizer. The management server 20 then determines the location (4,2), a travel cost for the vehicle C from the current location to which is the lowest and which is on the travel route for the vehicle A, as a transfer location. The above description is an outline of a method for determining a transfer destination vehicle and a transfer location.

[Flow of Transfer Destination Vehicle and Transfer Location Determination Process]

A process which is performed as described above by the information processing system to determine a transfer destination vehicle and a transfer location will be described with reference to a flowchart illustrated in FIG. 4. Note that the flowchart is started when an operation in which a user, such as a driver, in the vehicle A gives a transfer instruction to the input Unit 110A of the terminal 10A. Assume that vehicles as transfer destination candidates are the three vehicles B to D. Note that the number of vehicles as transfer destination candidates is not limited to three and may be one, two, or any number not less than four.

Note that processes in S1001 to S1003 below are performed by the terminal 10A, processes in S1004 and S1005, and S1009 to S1011 are performed by the management server 20, and that processes in S1012 and S1013 are performed by the terminal 10A and the terminal 10 corresponding to a transfer destination vehicle. Also, assume that the vehicle A is traveling in accordance with a predetermined (an intended) piece of route information for the vehicle A which is commonly stored in the management server 20 and the terminal 10A.

In S1001, a control unit 100A acquires a transfer instruction (request) from the input unit 110A. Although a transfer instruction indicates that a utilizer desires to make transfer in the present embodiment, the transfer instruction may include, for example, a piece of information on a desired goal (prescribed goal) for the utilizer. Note that although the control unit 100A acquires a transfer instruction from the input unit 110A in the present embodiment, for example, a transfer instruction may be transmitted from a smartphone or the like possessed by a user via the network and be acquired via a communication unit 140A.

In S1003, the control unit 100A controls a location acquisition unit 120A to acquire a current location of the terminal 10A as a piece of location information for the vehicle A. More specifically, the location acquisition unit 120A acquires, as the piece of location information, a current latitude and longitude of the terminal 10A. Note that if the location acquisition unit 120A has a piece of location information for the terminal 10A acquired immediately before the acquisition of the transfer instruction, the piece of information may be used as the piece of current location information for the vehicle A without newly acquiring a piece of location information.

In S1003, the control unit 100A controls the communication unit 140A to transmit the transfer instruction and the piece of location information to the management server 20 via the network. Note that, if the terminal 10A doubles as the management server 20, a shift may be made from S1002 to S1005 without performing the processes in S1003 and S1004.

In S1004, the control unit 200 receives (acquires) the transfer instruction (request) and the piece of location information from the communication unit 210 via the network.

In S1005, the control unit 200 controls the communication unit 210 to transmit a request to transmit a piece of location information to each of the terminals 10B to 10D. Although communications unit 210 makes the above-described request to the predetermined terminals 10B to 10D in the present embodiment, the present embodiment is not limited to this. For example, the communication unit 210 may periodically receive a piece of location information from each of the terminals 10B to 10D and may make the above-described request solely to the terminal 10, a piece of location information acquired last time for which is within a prescribed distance from a current location of the vehicle A. Alternatively, the control unit 200 may acquire a piece of information on a final goal for a utilizer in the vehicle A from the terminal 10A, and check pieces of route information for a plurality of vehicles and make a request for a piece of location information solely to a vehicle which intends to travel to the goal.

Processes in S1006 to S1008 will be described below. The processes are performed by each of the terminals 10B to 10D. Although just processes to be performed in the terminal 10B will be described below, the same processes are performed in the terminals 10C and 10D.

In S1006, a control unit 100B receives the request to transmit a piece of location information from a communication unit 140B via the network.

In S1007, the control unit 100B controls a location acquisition unit 120B to acquire a current location of the terminal 10B as a piece of location information for the vehicle B, as in the process performed by the control unit 100A in S1002. Note that, for example, if the number of utilizers exceeds the capacity, and the vehicle B is not suitable as the transfer destination vehicle, the process in S1007 need not be performed.

In S1008, the control unit 100B controls the communication unit 140B to transmit the piece of location information for the vehicle B to the management server 20 via the network. Note that, if the process in S1007 is not performed by the terminal 10B, as described above, the process in S1008 need not be performed.

In S1009, the control unit 200 receives (acquires), from the communication unit 210, respective pieces of location information transmitted from the terminals 10B to 10D. The control unit 200 also associates the acquired piece of location information for each vehicle with a vehicle ID and stores the pieces of information as a piece of current place information in the storage unit 220. Note that the control unit 200 judges a vehicle corresponding to the terminal 10, a piece of location information for which is not transmitted after a lapse of a prescribed period or longer since the request to transmit a piece of location information, as a vehicle unsuitable as a transfer destination and does not store a piece of location information corresponding to the vehicle in the storage unit 220. That is, when the prescribed time period or longer elapses since the request to transmit a piece of location information even if the control unit 200 has not received pieces of location information for all the vehicles B to D, a shift is made to S1010.

In S1010, the control unit 200 determines (chooses) a transfer destination vehicle and a transfer location for the utilizer in the vehicle A from the piece of route information for the vehicle A and the pieces of location information for the vehicles A to D That is, the control unit 200 matches route key locations of the piece of route information for the vehicle A with locations of the vehicles B to D and determines a transfer destination vehicle and a transfer location which are lowest in travel cost. The process in S1010 will be described later in detail.

In S1011, the control unit 200 controls the communication unit 210 to transmit a piece of information on the transfer location to the terminal 10A and the terminal 10 corresponding to the transfer destination vehicle. Note that the transmitted piece of information on the transfer location may be expressed as a non-relative location indicated by a latitude and a longitude or as the name of a landmark corresponding to the transfer location. That is, the transmitted piece of information on the transfer to may be any piece of information as long as a driver or the like in the vehicle as transmissions destination can judge a location. The control unit 200 also controls the communication unit 210 to transmit a piece of information on the transfer destination vehicle to the terminal 10A and a piece of information on the vehicle A to the terminal 10 corresponding to the transfer destination vehicle. A piece of information on a vehicle here refers to, for example, a piece of information on a license plate or a predetermined vehicle number.

The processes in S1012 and S1013 will be described below. The processes are performed by each of the terminal 10A and the terminal 10 corresponding to the transfer destination vehicle. Although just processes to be performed in the terminal 10A will be described below, the same processes are performed in the terminal 10 corresponding to the transfer destination vehicle. Note that since the transfer location is on a travel route based on the piece of route information for the vehicle A in the present embodiment, the control unit 200 need not transmit the transfer location to the terminal 10A, for example, in a case where the transfer destination vehicle can arrive at the transfer location earlier.

In S1012, the control unit 100A receives the pieces of information on the transfer location and the transfer destination vehicle (a vehicle which is to join up) from the communication unit 140A via the network.

In S1013, the control unit 100A notifies the utilizer and the driver of the transfer location and the transfer destination vehicle by displaying the transfer location and the transfer destination vehicle on the display unit 130A. More specifically, the name of the landmark at the transfer location and the name and a number on a license plate of the transfer destination vehicle may be displayed or a display may be provided to highlight the transfer location in an area map on the display unit 130A. The control unit 100A may also display a predicted time for arrival at the transfer location and the like on the display unit 130A together with the display or provide a display to tell a route to the transfer location.

The transfer destination vehicle may travel in accordance with the piece of route information for the vehicle A after transfer at the transfer location. This can be implemented b the control unit 200 through controlling the communication unit 210 to transmit the piece of route information for the vehicle A to the transfer destination vehicle. Note that since the piece of route information transmitted by the management server 20 is used as a travel route in the present and the future for the transfer destination vehicle, the piece of route information may include a piece of information on the transfer point to a travel end location for the vehicle A. This allows the vehicle A and the transfer destination vehicle to run along a whole of the predetermined travel route for the vehicle A. Thus, even if a plurality of utilizers with different goals are in the vehicle A, all the utilizers can be transported to the respective goals the vehicle A and transfer destination vehicles. Note that, if a final goal desired by a utilizer which is to make transfer is not included in the piece route information for the vehicle A, the transfer destination vehicle need not travel in accordance with the piece of route information for the vehicle A.

With the above-described cooperation between the terminals 10A to 10D and the management server 20, the management server 20 can determine the transfer destination vehicle and the transfer location even when the vehicle A is traveling. That is, the above-described processing allows shortening of a time period needed for a utilizer to make transfer.

[Concerning Detailed Processes in S1010]

Details of the matching process to be performed by the management server 20 in S1010 will be described with reference to a flowchart illustrated in FIG. 5. Note that, for descriptive simplicity, a description will be given below on the assumptions that a transfer source vehicle, in which the terminal 10 receiving a transfer in is installed, is the vehicle A and that vehicles as transfer destination candidates are the vehicles B to D, as in the above-described process of the flowchart illustrated in FIG. 4.

In S2001, the control unit 200 first acquires the piece of route information for the vehicle A from the storage unit 220. The control unit 200 then determines a route location ID of N in the piece of route information for the vehicle A which corresponds to a location closest to a location (current location) of the vehicle A at the time of receipt of the transfer instruction. For example, since the vehicle A is at the location (1,3) at the time of receipt of the transfer instruction in the example illustrated in FIG. 3A, the control unit 200 extracts a route location ID of 3 corresponding to the location (1,3) and determines that N=3. Note that, if the utilizer and the driver of the vehicle A tolerate transfer at any route key location from the currant location to a travel start location (a location corresponding to a route location ID of 0), N may be always set to 0.

In S2002, the control unit 200 first acquires a piece of current place information from the storage unit 220. The control unit 200 then determines a smallest vehicle ID of M among vehicle IDs corresponding to vehicles other than the vehicle A in the piece of current place information. For example, in the example illustrated in FIG. 3A, the control unit 200 extracts a smallest vehicle ID of 2 among the vehicle IDs corresponding to the vehicles other than the vehicle A and determines that M=2.

In S2003, the control unit 200 makes initial settings for calculating through matching a travel cost from each of the locations of the vehicles B to D each of the plurality of route key locations for the vehicle A. More specifically, the control unit 200 sets a next route key location after the current location of the vehicle A as a first object of matching by setting a piece i of temporal information indicating a route location ID as an object of matching to N+1. The control unit 200 then sets, as a first object of matching, a vehicle with a smallest vehicle ID among the vehicle IDs corresponding to the vehicles other than the vehicle A by setting a piece j of temporal information indicating a transfer destination vehicle ID as an object of matching to M. The control unit 200 further initializes a minimum cost minD indicating a smallest travel cost calculated through matching to ∞ (infinity) That is, in S2003, the control unit 200 determines a route key location and a vehicle as first objects of matching and determines an initial value for a smallest travel cost which is calculated through matching.

For example, in the example illustrated in FIG. 3A, the control unit 200 sets the piece i of temporal information to 3+1=4, sets the piece j temporal information to 2, and set the minimum cost minD to ∞. Note that the minimum cost minD need not always be set to ∞ and may be any numerical value as long as the numerical value is a value larger than a value conceivable for a travel cost.

In S2004, the control unit 200 performs matching processing. That is, the control unit 200 calculates a travel cost D for travel from a locations corresponding to a vehicle ID of j in the piece of current place information to as location corresponding to a route ID of i in the piece of route information for the vehicle A. For example, assuming the piece j of temporal information to be 3 and the piece i of temporal information to be 5 in the example illustrated in FIG. 3A, the control unit 200 calculates the travel cost D from a current location (4,3) of the vehicle C to a location (2,2) on the travel route for the vehicle A to be 3. Note that the travel cost D may be, for example, a travel time period, a travel distance, or a value obtained by weighting and combining a travel time period and a travel distance as long as the travel cost D is an indicator of difficulty in travel (ease of travel). Since the travel cost D determined in S2004 indicates a travel cost needed for joining and indicates difficulty in joining, the travel cost can also be referred to as a joining cost. That is, a travel cost indicates difficulty in travel while a joining cost can be said to be evaluated in difficulty in joining on the basis of a travel cost.

Note that the travel cost D may be a travel cost D2 from the location corresponding to the vehicle ID of j in the piece of current place information to a goal for the utilizer (a prescribed goal) via the location corresponding to the route location ID of i in the piece of route information for the vehicle A. That is, a travel cost from A current location of a vehicle as a transfer destination candidate to the goal for the utilizer via a given location along the travel route for the vehicle A may be obtained. This makes it possible to determine a vehicle which can travel easily from a current location of the vehicle goal for the utilizer and a location which facilitates the travel as a transfer destination vehicle and a transfer location. Note that the goal for the utilizer used to calculate a travel cost may be a dropoff place for the utilizer or a delivery point for a package. That is, the goal may be any location (point or place) as long as the location is a location designated by the vehicle A.

Alternatively, the travel cost D may be a larger one of a travel cost from the current location of the vehicle A to the goal for the utilizer via the location corresponding to the route location ID of i in the piece of route information for the vehicle A and the above-described travel cost D2. Note here that a travel time period is desirably used as a travel cost. That is, the travel cost D here refers to a travel time period which the utilizer in the vehicle A consumes from a current point in time to a point in time of arrival at the goal for the utilizer. Thus, with use of the travel cost D, a transfer location and a transfer destination vehicle which allow the utilizer in the vehicle A to arrive at the goal early can be determined.

Alternatively, the travel cost D may be multiplied by factor which increases with the number of utilizers in or the occupancy of a vehicle corresponding to the vehicle ID of j. It is to curb influence on many utilizers in terms of convenience and the like by determining a transfer destination vehicle in consideration of the number of occupants and occupancy.

In S2005, the control unit 200 compares the travel cost calculated S2004 with the minimum cost minD, That is, whether the travel cost D calculated most recently is smaller than minD that is a smallest value among travel costs calculated up to the current point in time except for the most recent one is judged here. If the travel cost D is smaller, a shift is made to S2006. In the other cases, a shift is made to S2007.

Note that, in S2005, travel from the current location of the vehicle A to the location corresponding to the route location ID of i in the piece of route information for the vehicle A may also be taken into consideration. That is, the control unit 200 calculates a travel cost D' for travel from the current location of the vehicle A to the location corresponding to the route location ID of i in the piece of route information for the vehicle A. If the travel cost D'<the travel cost D, the process step shifts to S2007 even when the minimum travel cost minD>the travel cost D. Thus, the control unit 200 determines the transfer location such that a travel cost from the current location of the A to the transfer location has a value larger than that of a travel cost for the transfer destination vehicle to the transfer location. This excludes a location, to which the vehicle A can travel more easily than the transfer destination vehicle, from a list of candidates for the transfer location, which allows the vehicle A or the utilizer to be prevented from waiting at the transfer location.

In S2006, the control unit 200 updates the minimum travel cost minD to a value of the travel cost D. In order to store a route location ID and a vehicle ID which involve a smallest travel cost, the control unit 200 sets minN indicating a route location ID to i and minM indicating a vehicle ID to j and stores minN and minM in the storage unit 220.

In S2007, the control unit 200 judges whether a vehicle corresponding to a vehicle ID of j+1 is the vehicle A. If the vehicle corresponds to the vehicle A, a shift is made to S2008. If the vehicle does not correspond to the vehicle A, a shift is made to S2009.

In S2008, the control unit 200 performs a process of adding 1 to the piece j of temporal information. Since the piece j of temporal information indicates a vehicle ID as a current object of matching, the vehicle A is included among objects of matching without the process. Thus, the process is performed to prevent the vehicle A from being determined as the transfer destination vehicle.

In S2009, the control unit 200 judges whether the piece of current place information includes a piece of information on the vehicle ID of j+1. For example, the piece of current place information illustrated in FIG. 3C includes just pieces of information on vehicle IDs of 0 to 4 and does not include a piece of information on a vehicle ID of 5. If the piece of current place information includes the piece of information on the vehicle ID of j+1, a shift is made to S2010. If the piece of current place information does not include the piece of information, a shift is made to S2011.

In S2010, the control unit 200 adds 1 to the piece j of temporal information. After completion of the process in S2010, the process step shifts to S2004. That is, the control unit 200 repeats the processes in S2004 to S2009 times, the number of which is equal to the number of vehicles as transfer destination candidates, by changing a vehicle as an object of matching to a new vehicle.

In S2011, the control unit 200 judges whether the piece of route information includes a piece of information on a route location ID of i+1. For example, the piece of route information illustrated in FIG. 3B includes just pieces of information on route location IDs of 0 to 11 and does not include a piece of information on a route location ID of 12. If the piece of route information includes the piece of information on the route location ID of i+1, a shift is made to S2012. If the piece of route information does not include the piece of information, a shift is made to S2013.

In S2012, the control unit 200 adds 1 to the piece i of temporal information and sets the piece j of temporal information to M. That is, the control unit 200 changes a route key location as an object of matching to a new (next) one and initializes the vehicle as the object of matching. Thus, the control unit 200 repeats the processes in S2004 to S2011 times, the number of which is equal to the number of route key locations after the current location of the vehicle A.

In S2013, the control unit 200 determines (chooses) the transfer destination vehicle. More specifically, the control unit 200 determines, as the transfer destination, a vehicle corresponding to minM indicating a vehicle ID which involves a smallest travel cost.

In S2014, the control unit 200 determines (chooses) a transfer location. More specifically, the control unit 200 determines, as the transfer location, a route key location corresponding to minN indicating a route location ID which involves a smallest travel cost.

Note that the matching in S2004 need not be performed on all vehicle IDs and route location IDs as objects of matching. For example, if minD=0 in S2006, since there is no travel cost smaller than 0, the process step may shift to S2013. Alternatively, the utilizer may determine in advance a threshold Th which is a travel cost tolerable by the utilizer, and the process step may shift to S2013 if minD≤the threshold Th in S2006. In order to inhibit the vehicle A from traveling, a route locations ID corresponding to the current location of the vehicle A to a route location ID not more than a prescribed value may be regarded as objects of matching.

Note that determination of the transfer destination vehicle and determination of the transfer location are not limited to the above-described method. For example, if there is just one point suitable for transfer, at which a car can stop for a prescribed time period or longer or which is determined in advance as a stop, in the piece of route information for the vehicle A, the control unit 200 may determine the point as the transfer location without performing the above-described processing. If the vehicle A has an abnormality, the control unit 200 may determine, as the transfer location, one closest to the current location of the vehicle A among the route key locations of the piece of route information. The control unit 200 may determine, as the transfer destination vehicle, a vehicle which can travel most easily to the transfer location.

Although the utilizer's transfer has been described above, the present embodiments is not limited to this. For example, the present embodiment can be applied to takeover of delivery of an article (package), mere driver change, and the like. Thus, the present embodiment can be applied to not merely the utilizer's transfer but also a case where a plurality of vehicles join up. Additionally, although an example in which the transfer destination vehicle travels to a route key location between the current location of the vehicle A to the travel end location of the vehicle A has been described, the transfer destination vehicle may travel to a route key location between the travel start location of the vehicle A and the current location of the vehicle A. This allows, for example, determination of the transfer destination vehicle and the transfer location in, e.g., a case where the utilizer in the vehicle A wishes to turn back to get something left at or around a given point an a previously traveled route.

Note that, if a piece of route information corresponding to a transfer source vehicle is unknown, the management server 20 may estimate and determine (acquire) a piece of route information for the vehicle among a plurality of pieces of route information. For example, the management server 20 estimates and determines the piece of route information for the vehicle from pieces of information related to the vehicle, such as a piece of information on a previous travel route for the vehicle, a piece of information on a current location of the vehicle and a current time, a piece of information on a travel end location for the vehicle, and a bus line. Pieces of route information for a plurality of vehicles in a district where the transfer source vehicle runs are linked to a time schedule or the like and are stored in the storage unit 220, This allows the control unit 200 to acquire (determine) a piece of route information from the storage unit 220 in accordance with the above-described pieces of information. Not that a piece of information, such as the previous travel route for the vehicle, may be acquired (generated) by the terminal 10 corresponding to the transfer source vehicle or may be entered by a utilizers in the transfer source vehicle.

[Effects]

As described above, since transfer can be made without changing a route for a transfer source vehicle, the convenience for a utilizer in the transfer source vehicle can be prevented from declining. Also, since a vehicle lowest in a travel cost to a route for a transfer source vehicle is chosen as a transfer destination vehicle, a burden of travel in the transfer destination vehicle can be reduced. Additionally, since a travel route for a transfer source vehicle is not changed, a general bus, for which a fixed running route is designated, can be adopted as the transfer source vehicle.

[First Modification]

A method for, making transfer in which a transfer source vehicle travels so as not to change a travel route based on a predetermined piece of route information has been described in the first embodiment. A first modification will describe a method for making transfer by changing a travel route for a transfer source vehicle while curbing influence on a utilizer.

Figure 6A:
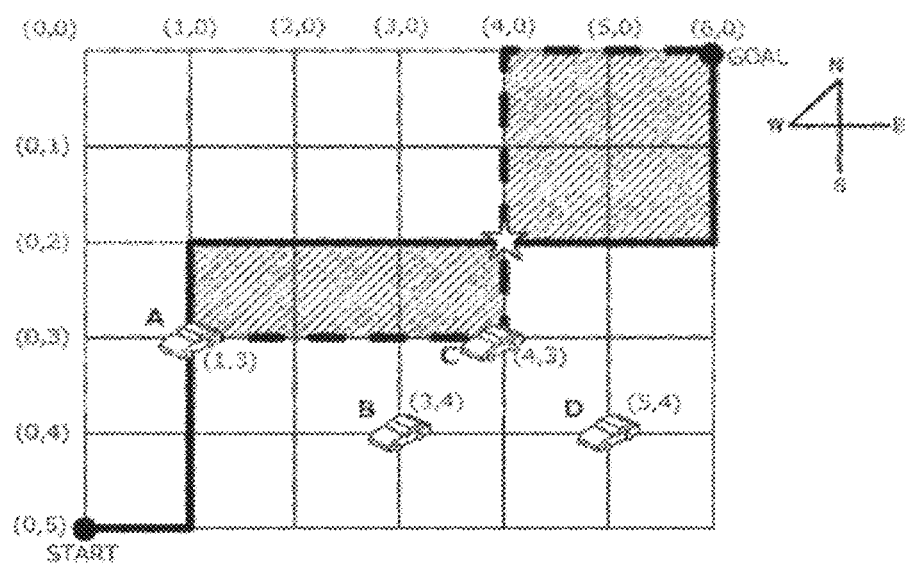

A concrete transfer method according to the first modification will be described with reference to FIGS. 6A and 6B. FIG. 6A illustrates a current location of and a piece of route information for a vehicle A as a transfer source and also illustrates current locations of vehicles B to D, like FIG. 3A. Assume here that two utilizers, a utilizer α and a utilizer β are in the vehicle A and that the terminal 10A gives an instruction that the two utilizers make transfer from the vehicle A to the management server 20. Note that the utilizer α has a location (6,0) as a goal, as in the first embodiment, and that the utilizer β has a location (4,2) as a goal. That is, the vehicle A needs to go through the location (4,2) as a way point. For simplicity, assume that, as for travel between two locations, a difference of 1 in a value of x in a location (x,y) corresponds to a travel cost of 1 and that a difference of 1 in a value of y corresponds to a travel cost of 1, as in the first embodiment.

Thus, for example, methods smallest in travel cost, by which the vehicle A alone heads from a current location (1,3) to the location (6,0) via the location (4,2), are not limited to travel along a route indicated by a bold line corresponding to a predetermined piece of route information. For example, a route indicated by a broken line in FIG. 6A is also included. That is, if the vehicle A travels in a hatched region in FIG. 6A, the vehicle A can travel at a smallest travel cost. Therefore, even if the vehicle A travels along a route different from the predetermined travel route, influence on a utilizer can be curbed.

For example, if routes in the hatched region are included in a travel route for the vehicle A, since the current location of the vehicle C is on the travel route for the vehicle A, transfer can be made with a travel cost of 0 at a location (4,3). Note that the number of way points is not limited to one and that the present modification can be applied to a case with going through a plurality of different way points.

[Concerning Transfer Process According to First Modification]

Figure 4:
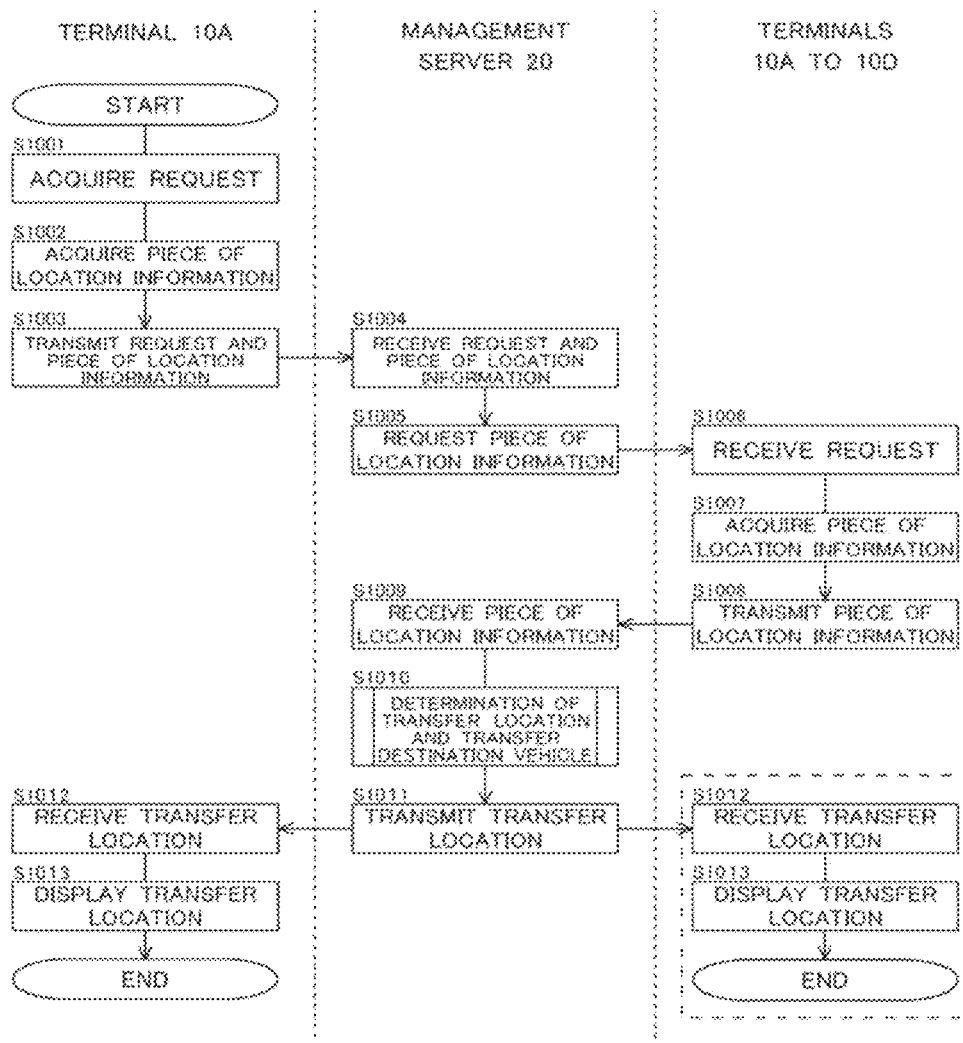
FIG. 4 is a process flowchart of the information processing system according to the first embodiment.
Figure 5:
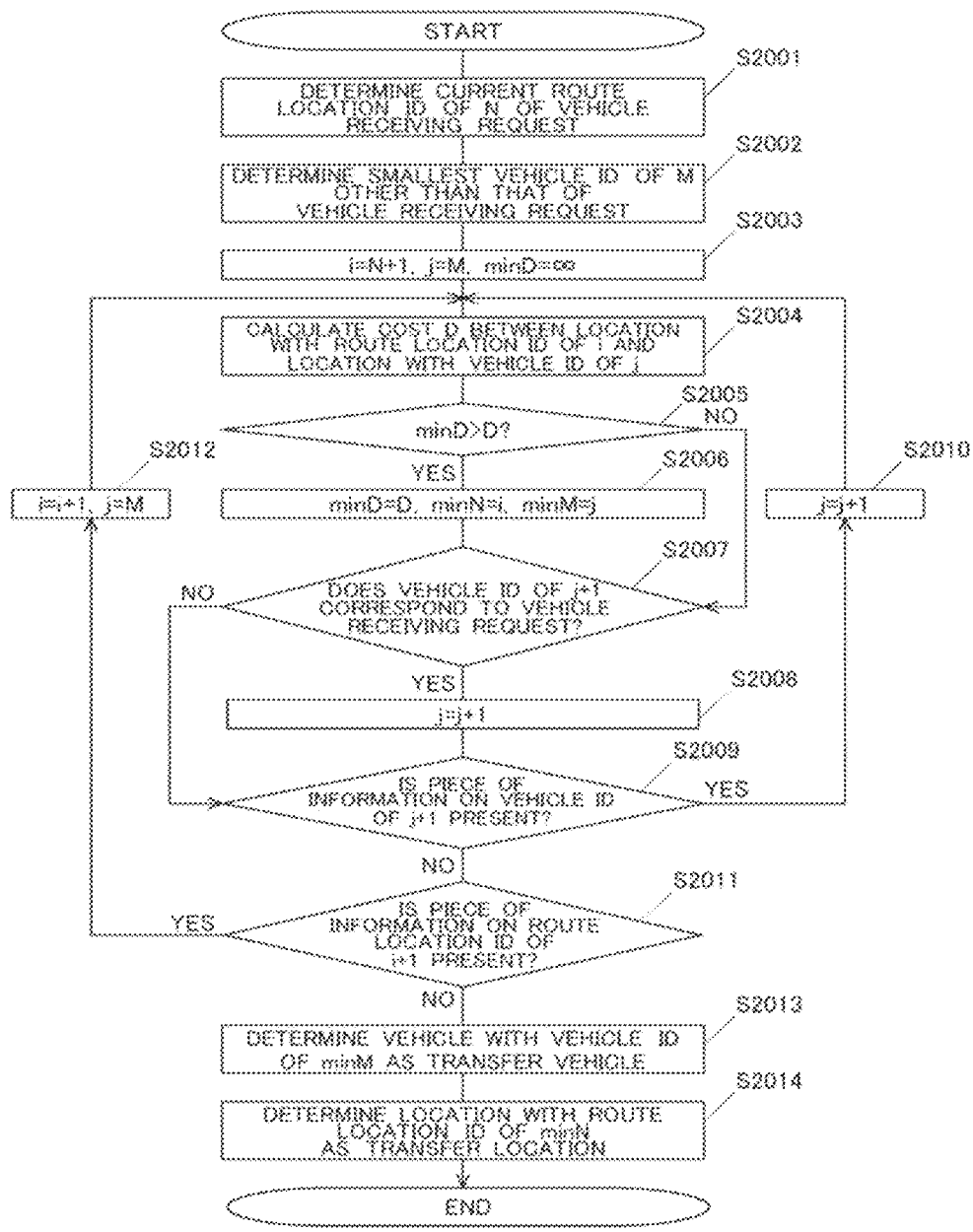
FIG. 5 is a transfer-related process flowchart according to the first embodiment.

To implement the above-described transfer, in the present modification, the control unit 200 changes and performs the process in S1010 of the flowchart illustrated in FIG. 4 according to the first embodiment. Note that processes other than that in S1010 are the same as those in the flowchart illustrated in FIG. 4 of the first embodiment and that a description thereof will be omitted. Just differences in S2001 to S2014 illustrating the detailed processes of S1010 from the first embodiment will be described below.

Before the start of the process of S2001 in S1010 of the first embodiment, the control unit 200 generates (determines) a piece of second route information from the piece of route information for the vehicle A and the current location of the vehicle A. The piece of second route information here refers to a piece of information including a travel route from when the vehicle A starts traveling to the present and routes, along which the vehicle A can travel (travels) after the present, so as not to influence a utilizer. That is, the piece of second route information can be said to be one, into which a plurality of pieces of route information including a piece of route information according to the first embodiment are integrated. Note that, since a route after the current location of the vehicle A is used in the present modification, a piece of information on a route, along which the vehicle A can travel after the present without influencing a utilizer, may be regarded as the piece of second route information.

More specifically, in the example illustrated in FIG. 6A, the control unit 200 generates (changes) a piece of second route information as illustrated in FIG. 6B such that the piece of second route information includes a location of an intersection of roads included in the hatched region. That is, in the present modification, the control unit 200 generates a piece of second route information including different travel routes which are identical in a travel cost from the current location of the vehicle A to a final travel end location of the vehicle A to a travel route based on the predetermined piece of route information. The control unit 200 also makes a setting such that each of the different travel routes goes through a desired goal (way point) for a user in the vehicle A. Note, in the piece of second route information as illustrated in FIG. 6B, that redundancy is eliminated to prevent the plurality of travel routes from having redundant route key locations and that the plurality of travel routes are compiled into one table. Additionally, the predetermined travel route and the different travel routes need not always be identical in travel cost. For example, travel routes, differences in travel cost from the predetermined travel route are not more tan a prescribed threshold, may be determined as the different travel routes.

Note that the piece of second route information need not always be such that a plurality of travel routes are compiled into one table, as in FIG. 6B, and may have a table for each travel route (piece of route information). For example, as for the example illustrated in FIG. 6A, tables for 24 ($=_4C_3 \times _4C_2$) travel routes (pieces of route information) may be regarded as the piece of second route information, as illustrated in FIG. 7. Thus, the piece of second route information illustrated in FIG. 6B can be said to be a summary of the piece of second route information illustrated in FIG. 7. Additionally, since a piece of information on locations, to which the vehicle A is to travel after a current point in time, is used in the present modification, the piece of second route information may be a piece of information on a plurality of travel routes from the current location of the vehicle A to the travel end location of the vehicle A.

In S2001 to S2014, the control unit 200 performs processing while replacing the term "piece of route information" in the first embodiment with the term "piece of second route information." Note that the control unit 200 does not perform the replacement if the control unit 200 generates a piece of second route information composed of tables for a plurality of pieces of route information, as illustrated in FIG. 7. In this case, the control unit 200 may determine a transfer destination vehicle and a transfer location corresponding to a smallest travel cost among all matching combinations by performing the processes in S2004 to S2012 for each of the plurality of pieces of route information. Note that, since the term "piece of second route information" is used instead of the term "piece of route information" in the first embodiment, as described above, it can be said that the control unit 200 changes the term "piece of route information" to the term "piece of second route information" before the start of the process of S2001 in S1010.

According to the first modification, it is possible to further make a travel cost for a transfer destination vehicle lower than n the first embodiment while curbing influence on the convenience for a utilizer of a transfer source.

[Second Modification]

In the first embodiment, a transfer destination vehicle and a transfer location are determined from a piece of route information for and a current location of a transfer source vehicle and a current location of a vehicle as a transfer destination candidate. In a second modification, a transfer destination vehicle and a transfer location are determined from a piece of route information for a vehicle as a transfer destination candidate, in addition to the above-described pieces of information.

Figure 8A:
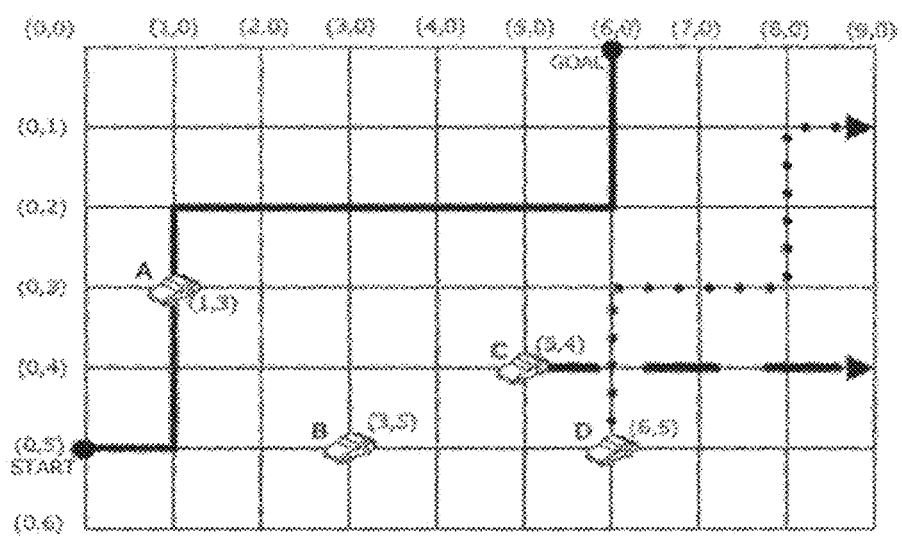

A concrete transfer method according to the second modification will be described with reference to FIGS. 8A and 8B. FIG. 8A illustrates a current location of and a piece of route information for a vehicle A as a transfer source and also illustrates current locations of vehicles B to D, like FIG. 3A. In the present modification, pieces of intended route information for the vehicles B to D are illustrated in FIG. 8A, in addition to a piece of intended route information for the vehicle A. Note that a piece of intended route information is a part of a piece of route information and is a piece of information indicating an intended travel route from a current location of a vehicle. That is, FIG. 8A illustrates that the vehicle C intends to travel from the current location (5,4) to a location (9,4), as indicated by a broken line, and that the vehicle D intends to travel from the current location (6,5) to a location (9,1), as indicated by a dotted line. Note that the vehicle B does not intend to travel and the piece of intended route information indicates just a location (3,5) which is the current location. For simplicity, assume that, as for a travel cost between two locations, a difference of 1 in a value of x in a location (x,y) corresponds to 1 and that a difference of 1 in a value of y corresponds to 1, as in the first embodiment.

Thus, a travel cost for the vehicle C to travel from a travel route based an the piece of intended route information for itself to a travel route for the vehicle A is 2. In contrast, a travel cost for the vehicle D to travel from a travel route based on the piece of intended route information for itself to the travel route for the vehicle A is 1. More specifically, a travel cost from a location (6,3) in the piece of intended route information for the vehicle D to a location (6,2) in the piece of route information for the vehicle A is 1. Note here that a transfer location and a transfer destination vehicle are determined in accordance with travel cost from each route key location it the piece of intended route information for each of the vehicles B to D to each route key location after the current location included in the piece of route information for the vehicle A. That is, the vehicle D can travel from the route, along which the vehicle D intends to travel, onto the travel route based on the piece of route information for the vehicle A at a low travel cost.

[Concerning Transfer Process According to Second Modification]

To implement the above-described transfer, in the present modification, the control unit 200 changes and performs the process in S1010 of the flowchart illustrated in FIG. 4 according to the first embodiment. Since processes other than that in S1010 are the same as those in the flowchart illustrated in FIG. 4 of the first embodiment, a description thereof will be omitted. Just differences in S2001 to S2014 illustrating the detailed processes of S1010 from the first embodiment will be described below.

Before the start of the process of S2001 in S1010 of the first embodiment, the control unit 200 generates a piece of location candidate information to be used instead of a piece of current place in from the current locations of the vehicles A to D and the pieces of intended route information for the vehicles B to D. At this time, the control unit 200 generates the piece of location candidate information such that the piece of location candidate information includes route key locations in the pieces of intended route information for the vehicles B to D, as illustrated in FIG. 8B. That is, the control unit 200 considers that the vehicles B to D can travel to the travel route based on the piece of route information for the vehicle A from locations, to which the vehicles B to D intend to travel after the present, in addition to the current locations of the vehicles B to D. For example, the piece of location candidate information illustrated in FIG. 8B includes locations corresponding to vehicle IDs of 4 to 7 which are key route locations in the piece of intended route information for the vehicle C and includes locations corresponding to vehicle IDs of 8 to 15 which are key route locations in the piece of intended route information for the vehicle D.

In S2001 to S2014, the control unit 200 performs processing while replacing the term "piece of current place information" in the first embodiment with the term "piece of location candidate information." Note that a more efficient transfer method may be implemented by combining the second modification and the first modification.

According to the second modification, a travel route for a transfer destination candidate can be taken into consideration. It is thus possible to determine, as a transfer destination vehicle, a vehicle which can travel most easily from an original travel route.

Other Embodiment

The above-described embodiment and modifications are merely illustrative, and the present disclosure can be appropriately changed and carried out without departing from the scope thereof.

The above-described embodiment and modifications have described transfer between (joining of) vehicles. The embodiment and modifications, however, are not limited to vehicles and can be applied to, for example, joining of people, joining of a train and a vehicle, and the like. That is, the embodiment and modifications can be applied as long as a transfer destination movable body can travel freely. An object on a vehicle is not limited to a person, and the embodiment and modifications can be applied to any object, such as an animal or a package to be delivered.

Processes and means described in the present disclosure can be freely combined and carried out as long as there is no technical discrepancy.

A process described as being performed by one apparatus may be shared and executed by a plurality of apparatuses. Alternatively, a process described as being performed by different apparatuses may be executed by one apparatus. By which hardware configuration (server configuration) functions are implemented in a computer system can be flexibly changed.

The present disclosure can also be implemented by supplying a computer program having the functions described in the above embodiment to a computer and reading out and executing the program by one or more processors of the computer. This computer program may be provided to the computer as a non-transitory computer-readable storage medium connectable to a system bus of the computer or may be provided to the computer via a network. Examples of the non-transitory computer-readable storage medium include any type of disk, such as a magnetic disk (e.g., a floppy (registered trademark) disk or a hard disk drive (HDD)) or an optical disc (e.g., a CD-ROM, a DVD, or a Blu-ray Disc), a read-only memory (ROM), a random access memory (RAM), an EPROM, an EEPROM, a magnetic card, a flash memory, an optical card, and any type of medium suitable for storing electronic instructions.

What is claimed is:

1. An information processing apparatus comprising a controller including at least one processor configured to perform:
   acquiring a request that a first vehicle join up with one vehicle of a plurality of vehicles, wherein the first vehicle is a passenger bus;
   determining a respective joining factor related to joining up with the first vehicle for each of the plurality of vehicles, the joining factor being determined based on route information that includes a travel route for the first vehicle and a respective current location of each of the plurality of vehicles different from the first vehicle, wherein the route information includes previous travel route information of the passenger bus indicating a bus line on which the passenger bus frequently travels;
   determining and selecting (i) a second vehicle that is to join up with the first vehicle from the plurality of vehicles and (ii) a joining location where the first vehicle and the second vehicle join each other at an intermediate location along the travel route, such that the determined joining factor of the second vehicle to travel to the joining location satisfies a prescribed condition; and
   transmitting, to the determined second vehicle, at least the joining location, the travel route of the first vehicle from the joining location to a place of arrival for the first vehicle, and route guidance information to direct the second vehicle to the joining location to join up with the first vehicle and to direct the second vehicle to continue traveling along the travel route of the first vehicle after arriving at the joining location to the place of arrival for the first vehicle, such that the second vehicle follows the bus line on which the passenger bus frequently travels and transfer can be made without changing a route for the first vehicle.

2. An information processing method comprising:
   a step of acquiring a request that a first vehicle join up with a one vehicle of a plurality of vehicles, wherein the first vehicle is a passenger bus;
   a step of determining a respective joining factor related to joining up with the first vehicle for each of the plurality of vehicles, the joining factor being determined based on route information that includes a travel route for the first vehicle and a respective current location of each of the plurality of vehicles different from the first vehicle, wherein the route information includes previous travel route information of the passenger bus indicating a bus line on which the passenger bus frequently travels;
   a step of determining and selecting (i) a second vehicle that is to join up with the first vehicle from the plurality of vehicles and (ii) a joining location where the first vehicle and the second vehicle each other at an intermediate location along the travel route, such that the determined joining factor of the second vehicle to travel to the joining location satisfies a prescribed condition; and
   a step of transmitting, to the determined second vehicle, at least the joining location, the travel route of the first vehicle from the joining location to a place of arrival for the first vehicle, and route guidance information to direct the second vehicle to the joining location to join up with the first vehicle and to direct the second vehicle to continue traveling along the travel route of the first vehicle after arriving at the joining location to the place of arrival for the first vehicle, such that the second vehicle follows the bus line on which the passenger bus frequently travels and transfer can be made without changing a route for the first vehicle.

3. A non-transitory computer readable storage medium having recorded thereon a program including computer-executable instructions causing a computer to execute:
   a step of acquiring a request that a first vehicle join up with one vehicle of a plurality of vehicles, wherein the first vehicle is a passenger bus;
   a step of determining a respective joining factor related to joining up with the first vehicle for each of the plurality of vehicles, the joining factor being determined based on route information that includes a travel route for the first vehicle and a respective current location of each of the plurality of vehicles different from the first vehicle, wherein the route information includes previous travel route information of the passenger bus indicating a bus line on which the passenger bus frequently travels;
   a step of determining and selecting (i) a second vehicle that is to join up with the first vehicle from the plurality of vehicles and (ii) a joining location where the first vehicle and the second vehicle join each other at an intermediate location along the travel route, such that the determined joining factor of the second vehicle to travel to the joining location satisfies a prescribed condition; and
   a step of transmitting, to the determined second vehicle, at least the joining location, the travel route of the first vehicle from the joining to a place of arrival for the first vehicle, and route guidance information to direct the second vehicle to the joining location to join up with the first vehicle and to direct the second vehicle to continue traveling along the travel route of the first vehicle after arriving at the joining location to the place of arrival for the first vehicle, such that the second vehicle follows the bus line an which the passenger bus frequently travels and transfer can be made without changing a route for the first vehicle.

* * * * *